United States Patent
Kovacevic-Milivojevic et al.

(10) Patent No.: US 10,932,891 B2
(45) Date of Patent: Mar. 2, 2021

(54) NOZZLE FOR ORAL IRRIGATOR DEVICE INCLUDING A NOZZLE SPACER ASSEMBLY

(71) Applicant: KONINKLIJKE PHILIPS N.V., Eindhoven (NL)

(72) Inventors: Milica Kovacevic-Milivojevic, Eindhoven (NL); Bart Gottenbos, Budel (NL); Marco Baragona, Delft (NL); Sergei Shulepov, Eindhoven (NL); Valentina Lavezzo, Heeze (NL); Guido Antonius Theodorus Adriaensen, s'Hertogenbosch (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 774 days.

(21) Appl. No.: 15/310,471

(22) PCT Filed: May 8, 2015

(86) PCT No.: PCT/IB2015/053367
§ 371 (c)(1),
(2) Date: Nov. 11, 2016

(87) PCT Pub. No.: WO2015/173699
PCT Pub. Date: Nov. 19, 2015

(65) Prior Publication Data
US 2017/0079755 A1   Mar. 23, 2017

Related U.S. Application Data

(60) Provisional application No. 61/992,448, filed on May 13, 2014.

(51) Int. Cl.
*A61C 17/028* (2006.01)
*A61C 17/02* (2006.01)
*A61C 15/00* (2006.01)

(52) U.S. Cl.
CPC .......... *A61C 17/0202* (2013.01); *A61C 15/00* (2013.01); *A61C 17/028* (2013.01)

(58) Field of Classification Search
CPC .............. A61C 17/0202; A61C 17/028; A61C 17/3427; A61C 15/00; A61C 17/02;
(Continued)

(56) References Cited

U.S. PATENT DOCUMENTS 2,206,726 A * 7/1940 Lasater ................ A46B 3/005
   15/188
3,214,775 A * 11/1965 Murov .................. A61C 17/38
   15/22.1
(Continued)

FOREIGN PATENT DOCUMENTS

WO   2010124814 A1   11/2010

OTHER PUBLICATIONS

Cense: "A Spray Based Method for Biofilm Removal"; Technische Universiteit Eindhoven, 2005, 180 Page Document.
(Continued)

*Primary Examiner* — Michael J Tsai

(57) ABSTRACT

A nozzle (12) for an oral irrigator device (10) having a guidance tip (34) with at least one orifice (36) at one end, and a nozzle spacer assembly (58) positioned around the at least one orifice (36). The at least one orifice is configured to expel a fluid as one of a jet, a spray, or any combination thereof. The nozzle spacer assembly (58) comprises at least two pairs of pliable spacers (60) that extend from the surface (35) for ensuring that the area at an entrance of an interproximal space between two teeth are treated, and (ii) establishing an improved angle of impact of the fluid expelled from the orifice.

13 Claims, 9 Drawing Sheets

(58) Field of Classification Search
CPC .. A61M 2205/0266; A61M 2205/0272; A61M 2205/0283; A61M 2205/0294; A61M 3/0275; A61M 3/0279
USPC ............... 601/162, 160, 161, 164, 163, 169
See application file for complete search history.

(56) References Cited

U.S. PATENT DOCUMENTS

| | | | | |
|---|---|---|---|---|
| 3,736,923 | A * | 6/1973 | Parkison | A61C 17/028 601/163 |
| 3,739,983 | A * | 6/1973 | Jousson | A61C 17/0202 239/101 |
| 8,444,416 | B2 * | 5/2013 | Chenvainu | A61C 17/28 433/80 |
| 2002/0152565 | A1 | 10/2002 | Klupt | |
| 2006/0078844 | A1 * | 4/2006 | Goldman | A61C 1/0084 433/80 |
| 2007/0113360 | A1 * | 5/2007 | Tsai | A46B 13/008 15/29 |
| 2009/0092949 | A1 * | 4/2009 | Duineveld | A61C 17/022 433/216 |
| 2010/0015567 | A1 * | 1/2010 | Elbaz | A46B 11/063 433/89 |
| 2010/0190132 | A1 * | 7/2010 | Taylor | A61C 17/0202 433/80 |
| 2010/0304327 | A1 * | 12/2010 | Grez | A61C 17/02 433/88 |
| 2014/0259474 | A1 * | 9/2014 | Sokol | A61C 17/0202 15/22.2 |

OTHER PUBLICATIONS

Shulepov et al: "Mechanical Properties of S. Mutans Biofilms, and Application to Oral Health Care Devices"; Technical Note PR-TN 2013/00232, Philips Research Eruope, Jun. 20, 2013.

* cited by examiner (4A) (4B)

(4C) (4D)

NOZZLE FOR ORAL IRRIGATOR DEVICE INCLUDING A NOZZLE SPACER ASSEMBLY

CROSS-REFERENCE TO PRIOR APPLICATIONS

This application is the U.S. National Phase application under 35 U.S.C. § 371 of International Application No. PCT/IB2015/053367, filed on May 13, 2014, which claims the benefit of U.S. Provisional Patent Application No. 61/992,448, filed on May 13, 2014. These applications are hereby incorporated by reference herein.

This application claims the benefit or priority of and describes relationships between the following applications: wherein this application claims the priority of U.S. Provisional Patent Application Ser. No. 61/992,448, filed May 13, 2014, which is incorporated herein in whole by reference.

The present embodiments relate generally to flossing devices and methods in the field of oral healthcare and, more particularly, to oral irrigator devices and methods including a nozzle spacer assembly for high impact angles.

One example of a device for use in cleaning between teeth is a Sonicare AirFloss device available from Philips Oral Healthcare, Inc. The oral care device is based upon a microburst technology that delivers a quick burst of air and liquid to effectively yet gently clean between teeth. The oral care device is designed to remove dental plaque biofilms from the interdental areas between teeth to improve gingival health through the use of the high-velocity droplet spray. It aims is to be at least as effective as ordinary string flossing and conventional oral irrigators/water jets, while much easier and more comfortable to use. In practice, however, the efficacy may be limited, since the area reached effectively is limited by the nozzle design, with a fairly narrow and focused spray on the so-called interproximal area below the contact points of neighbouring teeth towards the gingival tissue. As a consequence, not all plaque between teeth may be removed. For convenience, as used herein, interdental plaque is synonymous for interproximal plaque and all plaque on the proximal surfaces of the teeth. A distinction can be made between "visible interproximal plaque" which is located on the entrances of an interproximal space and "invisible interproximal plaque" which is located within the interproximal space and which may be made visible, for example, with advanced imaging techniques such as miniature fiber optic cameras.

Accordingly, an improved method and apparatus for overcoming the problems in the art is desired. In particular, it would be desirable to increase an effective interdental area covered by the jet or spray of a nozzle and, in addition, use higher impact angles.

In accordance with the embodiments of the present disclosure, oral irrigator device nozzles and methods are configured for advantageously increasing an effective interdental area covered by a spray or jet of a nozzle, and in addition, using the spray or jet of the nozzle at higher impact angles which results in a strong improvement in plaque biofilm removal. A number of different nozzle designs are disclosed herein which increase an impact angle at which a microburst spray or jet impacts a plaque layer. The nozzle designs advantageously include nozzle orifices that can shoot or expel a microburst spray or jet more from the side (e.g., at an angle of between approximately 15 to 90 degrees to a given proximal tooth surface, as opposed to being along the given tooth surface, e.g., at an angle near 0 degrees). In another embodiment, the nozzle design includes dual distance nozzle orifices, in which a portion of a nozzle is moved further inside the interproximal space between teeth to reach larger impact angles. In accordance with one aspect, a nozzle for an oral irrigator device is disclosed that comprises an elongated body having a channel; a guidance tip located at one end of the elongated body; and a nozzle spacer assembly positioned around the at least one orifice of said guidance tip. The guidance tip includes at least one orifice coupled to the channel and disposed within a surface of the guidance tip. In addition, the at least one orifice is configured to expel a fluid as one of a jet, a spray, or any combination thereof. Furthermore, the nozzle spacer assembly comprises at least two pairs of pliable spacers that extend from the surface of said guidance tip by a prescribed amount for both (i) ensuring that teeth portions at an entrance of an interproximal space between two teeth are treated by fluid expelled from the at least one orifice, and (ii) establishing an angle of impact of the fluid expelled from the at least one orifice into the interproximal space between the two teeth, onto respective tooth surfaces thereof, to be higher than a threshold impact angle.

In accordance with another aspect, the at least two pairs of pliable spacers of the nozzle spacer assembly comprise a first pair and a second pair, wherein the first pair extends along a line in a first direction and the second pair extends along a line in a second direction, and the lines of the first and second pairs are perpendicular to one another. In addition, the at least two pairs of pliable spacers are further configured for both (i) establishing a prescribed spacing between the at least one orifice and a treatment surface and (ii) locating the guidance tip laterally with respect to the interproximal spacing between two teeth.

In accordance with another aspect, the at least one orifice of the guidance tip comprises two orifices evenly spaced apart from a center of the surface of the guidance tip, and further being spaced apart from one another within the surface of the guidance tip such that during use a first orifice is located in front of a first tooth and a second orifice is located in front of a second tooth. In addition, responsive to fluid being expelled from the two orifices, the first orifice expels fluid partly on the first tooth and mainly on a proximal surface of the second tooth within the interproximal space at a first high impact angle with respect to the proximal surface of the second tooth within the interproximal space, and wherein the second orifice expels fluid partly on the second tooth and mainly on a proximal surface of the first tooth within the interproximal space at a second high impact angle with respect to the first tooth.

In another embodiment, fluid expelled from the first orifice comprises at least one of a jet and a spray principally directed along a first path, wherein fluid expelled from the second orifice comprises at least one of a jet and a spray principally directed along a second path.

In a still further embodiment, fluid is expelled in a controlled manner to alternate between the first orifice and the second orifice a predetermined number of times for a single interproximal space.

In yet another embodiment, the nozzle further comprises a disc rotatably coupled to the surface of the guidance tip, and wherein the at least one orifice comprises a single orifice embodied within the rotatable disc configured for enabling at least two different positions of the single orifice with respect to the interproximal space between two teeth. In one embodiment, the rotatable disc includes an impellor located in a flow path of expelled fluid, wherein responsive to the expelled fluid imparting upon the impellor, the rotatable disc is turned to enable an achievement of the at least two different positions of the single orifice with respect to the interproximal space between two teeth.

In a further embodiment, the at least one orifice comprises multiple orifices disposed within the surface of said guidance tip, wherein each of the multiple orifices expels fluid in a different radial direction.

In a still further embodiment, the guidance tip comprises a dual distance tip that further includes at least one interproximal orifice disposed on an interproximal extension of the guidance tip that extends at a distance beyond the surface of the guidance tip, configured for removable placement within the interproximal space between the two teeth, and wherein the at least one interproximal orifice is configured to expel the fluid as one of a jet, a spray, or any combination thereof, with a spray angle greater than a threshold amount to at least one side of the two teeth within the interproximal space.

Still further advantages and benefits will become apparent to those of ordinary skill in the art upon reading and understanding the following detailed description.

The embodiments of the present disclosure may take form in various components and arrangements of components, and in various steps and arrangements of steps. Accordingly, the drawings are for purposes of illustrating the various embodiments and are not to be construed as limiting the embodiments. In the drawing figures, like reference numerals refer to like elements. In addition, it is to be noted that the figures may not be drawn to scale.

Figure 4:
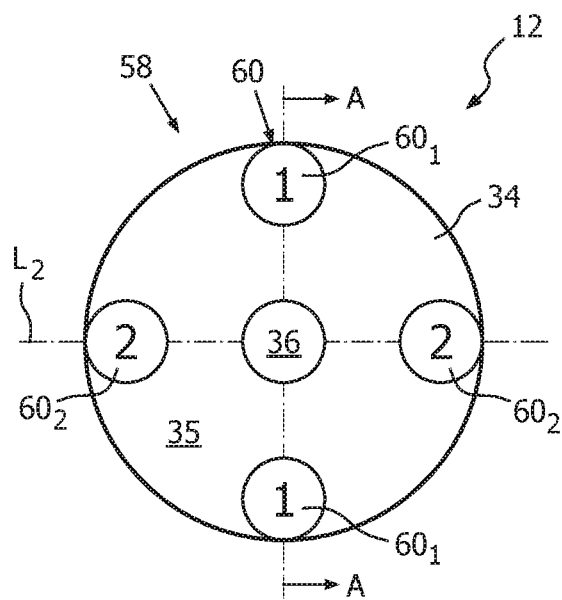
Figure 4:
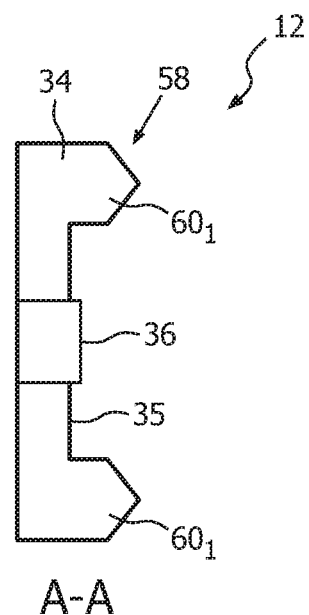
Figure 4:
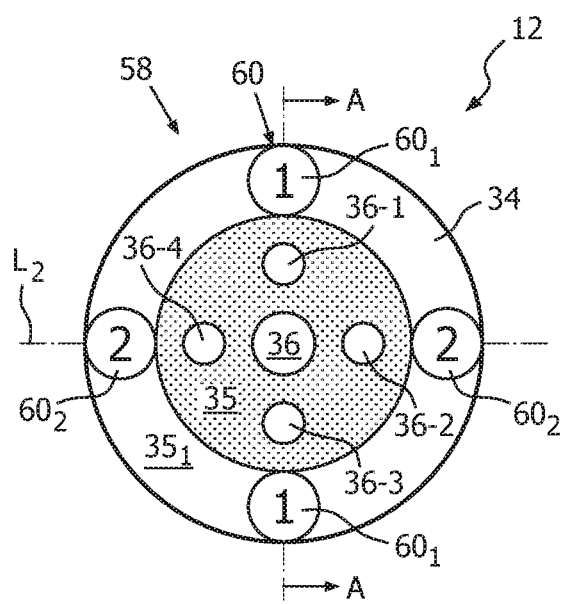
Figure 4:
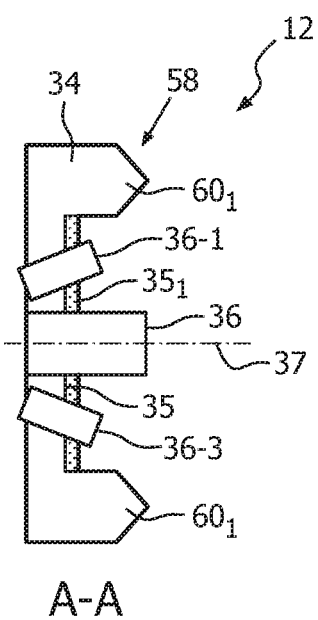
Figure 5:
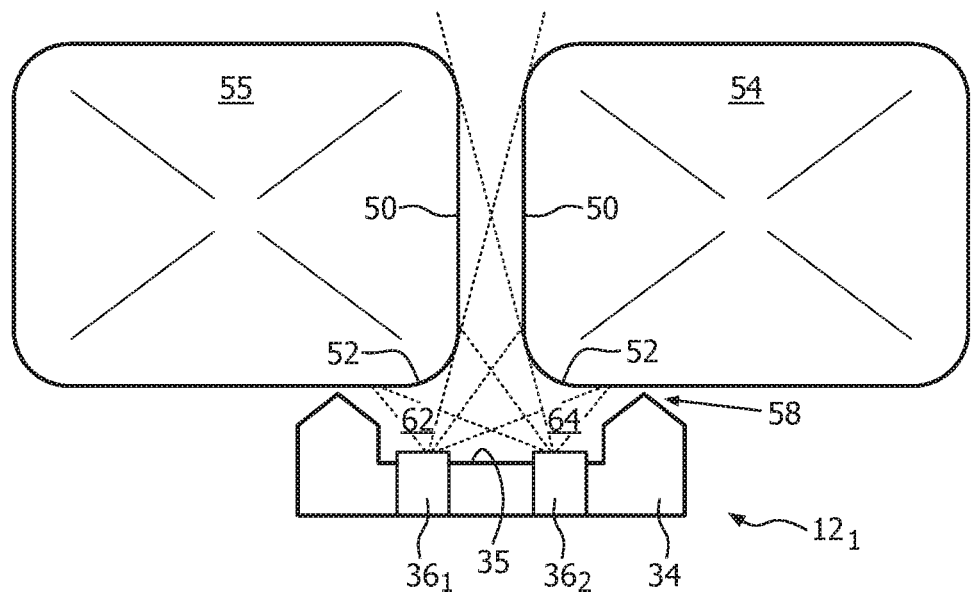
Figure 6:
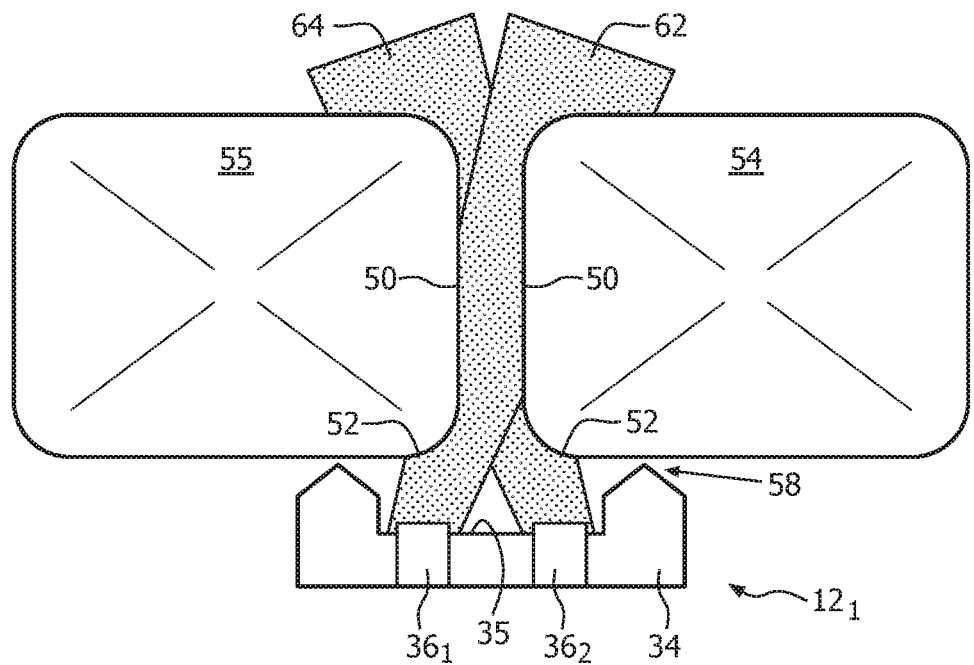
Figure 7:
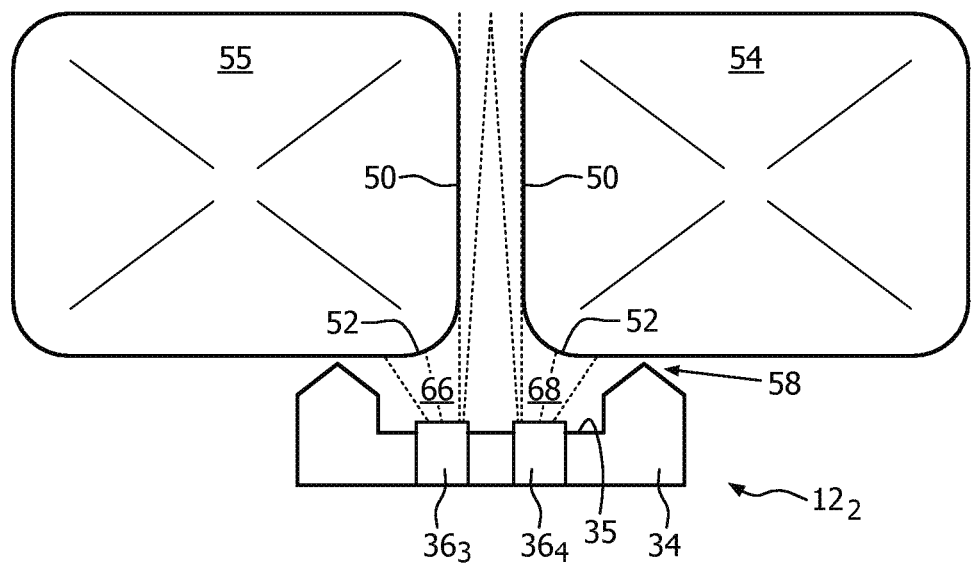
Figure 8:
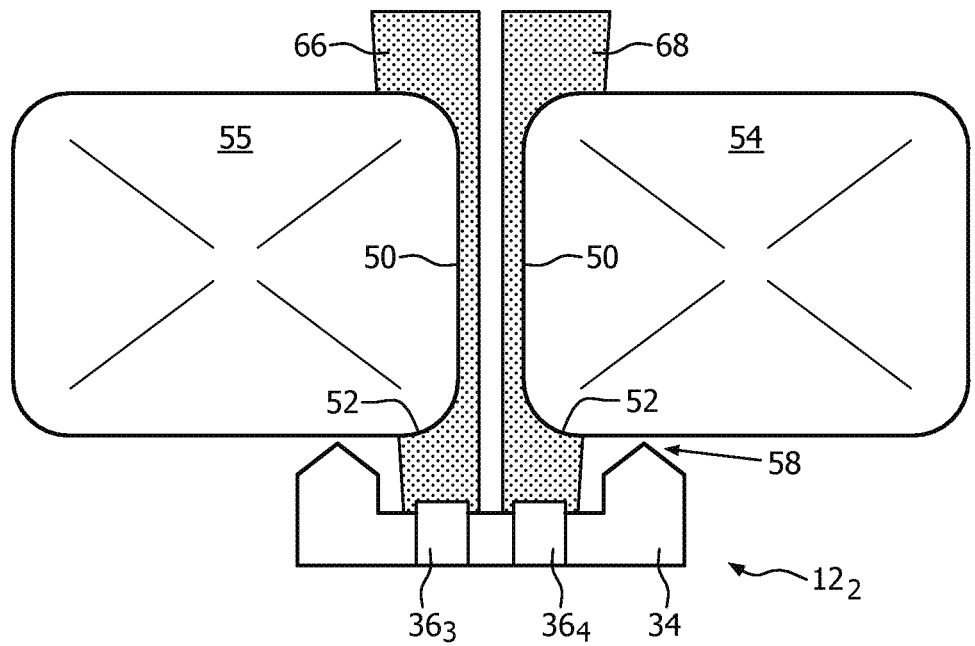
Figure 9:
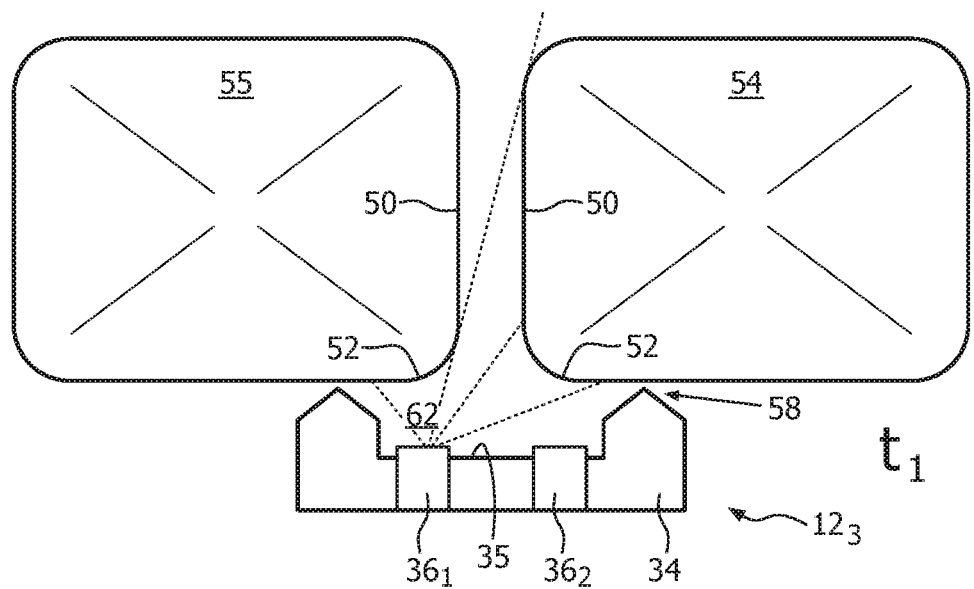
Figure 10:
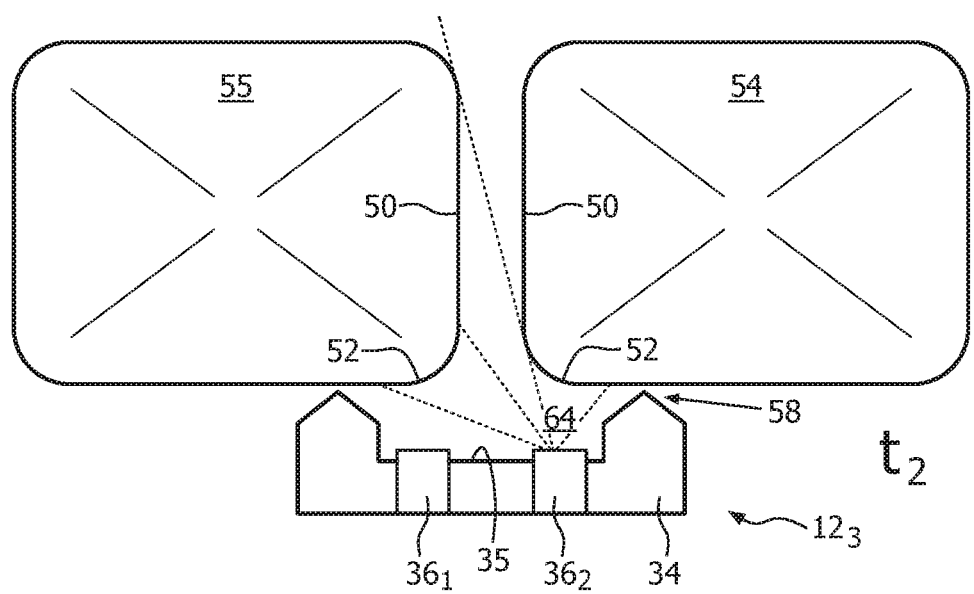
Figure 11:
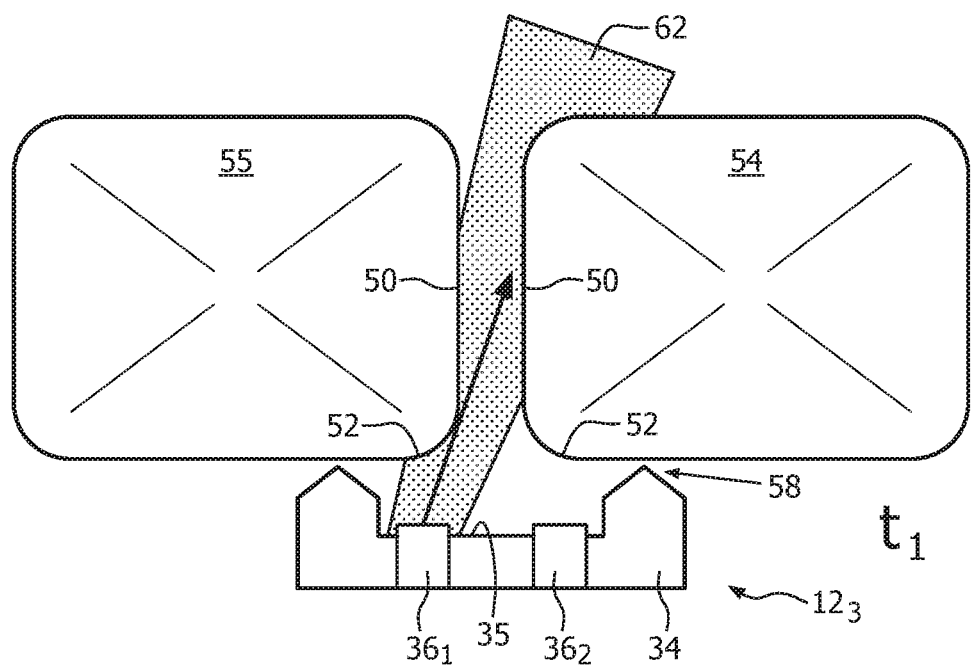
Figure 12:
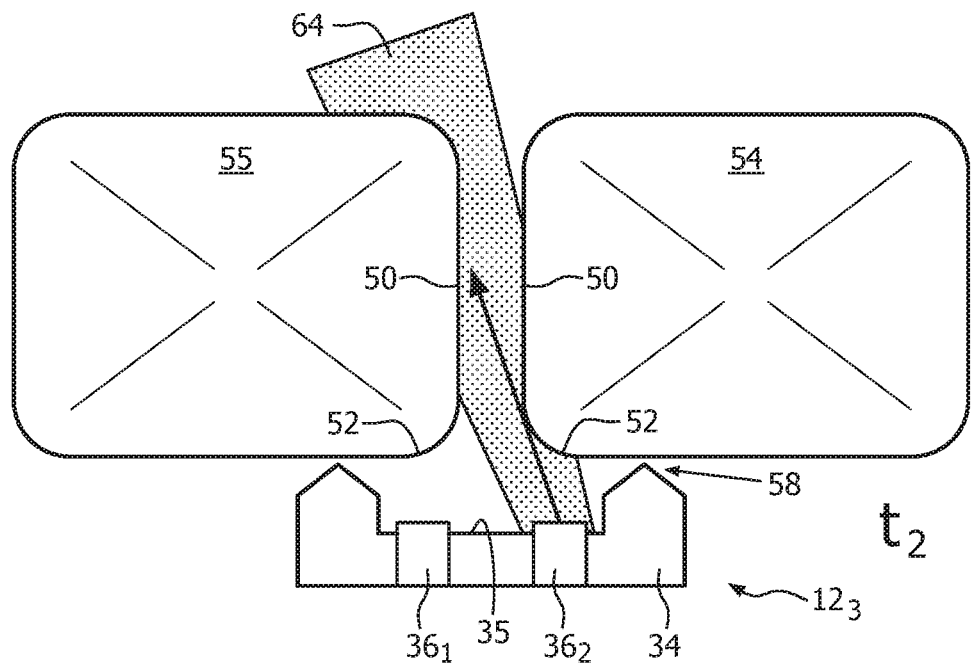
Figure 13:
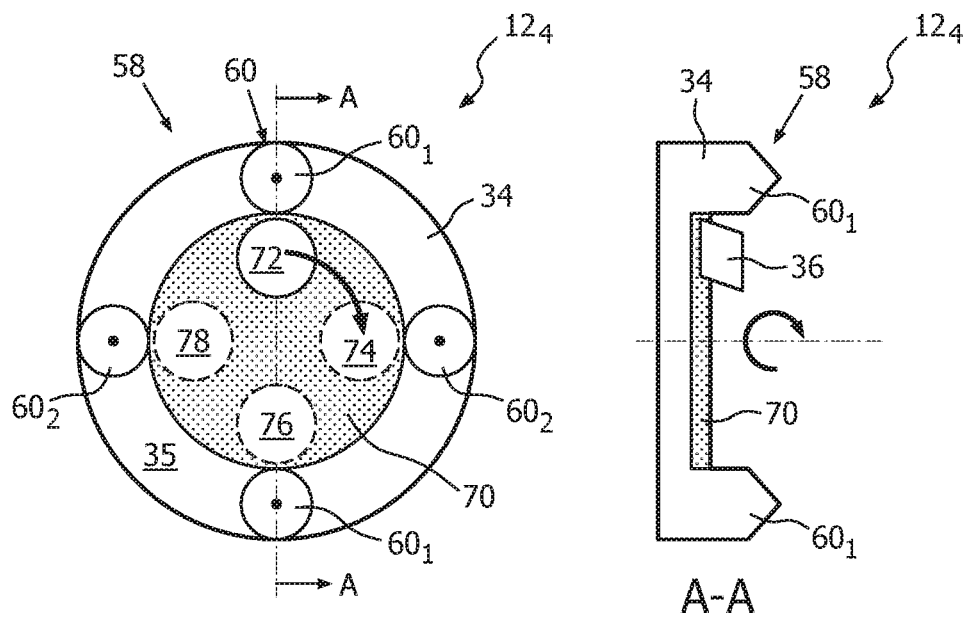
Figure 14:
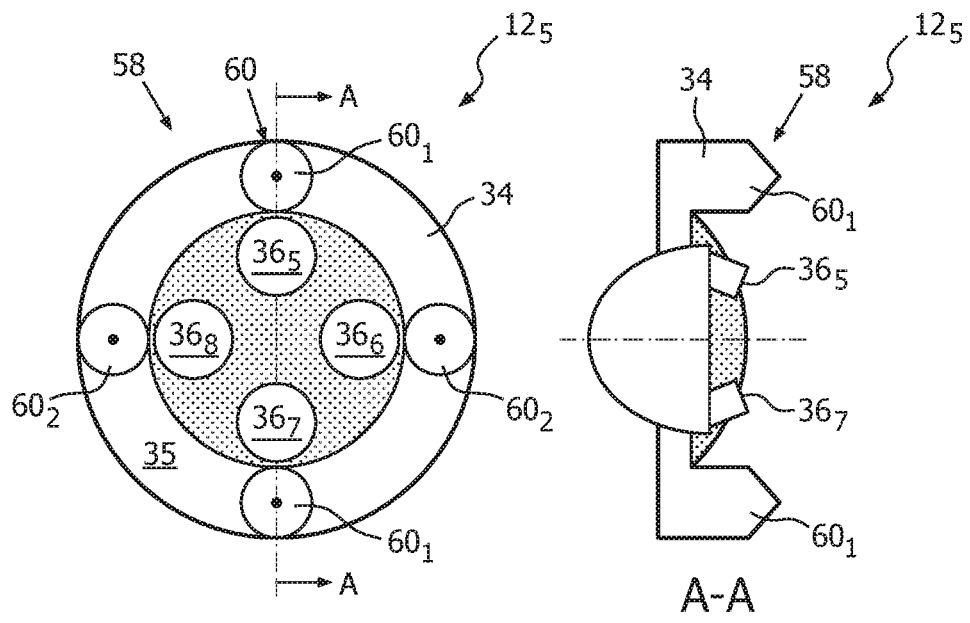
Figure 15:
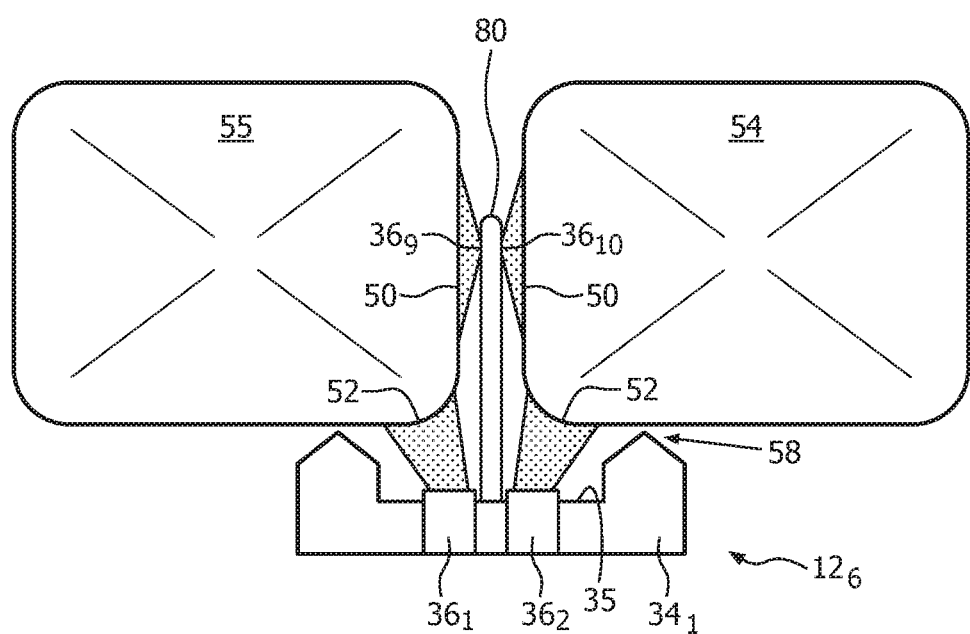

FIG. 4 (4A, 4B) is a top view and sectional view along A-A of a nozzle design of an oral irrigator including a nozzle spacer assembly for high impact angles according to an embodiment of the present disclosure and (4C, 4D) is a top view and sectional view along A-A of a nozzle design of an oral irrigator including a nozzle spacer assembly for high impact angles according to another embodiment of the present disclosure;

FIGS. 5 and 6 are schematic views of a nozzle design of an oral irrigator device having a first orifice and a second orifice according to an embodiment of the present disclosure;

FIGS. 7 and 8 are schematic views of a nozzle design of an oral irrigator device having a first orifice and a second orifice according to another embodiment of the present disclosure;

FIGS. 9 and 10 are schematic views of a nozzle design of an oral irrigator device having a first orifice and a second orifice having first and second paths of a spray expelled from one of the first and second orifice respectively at a first time ($t_1$) and a second time ($t_2$), according to an embodiment of the present disclosure;

FIGS. 11 and 12 are schematic views of a nozzle design of an oral irrigator device having a first orifice and a second orifice having first and second paths of a jet expelled from one of the first and second orifice respectively at a first time ($t_1$) and a second time ($t_2$), according to an embodiment of the present disclosure;

FIG. 13 (13A, 13B) is a top view and sectional view along A-A of a nozzle design of an oral irrigator device with an orifice embodied within a rotatable disc and including a nozzle spacer assembly for high impact angles according to an embodiment of the present disclosure;

FIG. 14 (14A, 14B) is a top view and sectional view along A-A of a nozzle design of an oral irrigator device with multiple orifices and including a nozzle spacer assembly for high impact angles according to an embodiment of the present disclosure; and FIG. 15 is a schematic view of a nozzle design of an oral irrigator device having a dual distance guidance tip that includes a first orifice and a second orifice within a surface thereof and at least one interproximal orifice disposed on an interproximal extension of the guidance tip that extends at a distance beyond the surface of said guidance tip, configured to expel fluid with a spray angle greater than a threshold amount to at least one side of the two teeth within the interproximal space.

The embodiments of the present disclosure and the various features and advantageous details thereof are explained more fully with reference to the non-limiting examples that are described and/or illustrated in the drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which the embodiments of the present disclosure belong. Preferred methods, devices, and materials are described, although any methods and materials similar or equivalent to those described herein can be used in the practice or testing of the embodiments.

It has been discovered, via experiments, that the angle at which a microburst spray or jet of a biofilm removal device impacts a plaque biofilm inside the interproximal space between teeth is of major influence for the removal of the plaque. In particular, various percentages of biofilm removed in interproximal locations where the microburst spray or jet of the biofilm removal device impacted the biofilm for different angles. Experimental results revealed that an increase in angle increases the removal dramatically.

The experimental findings were supported with numerical simulations of droplet and jet impact on a wetted surface at the different angles, using a droplet diameter of 100 µm and a velocity of 30 m/s. From the numerical simulations of droplet impact on a wetted surface, the inventors found out that (i) increasing the impact angle, from about 10 degrees and up to about 60 degrees, increases the shear efficiency of the droplet, and that (ii) the pressure and shear stress values reveal that for an impact angle above 60 degrees, the pressure and shear stress values do not increase significantly anymore.

From the numerical simulation of the jet impact on the wetted surface at different angles it was further found that: (i) average pressure increases with angle, (ii) maximum pressure occurs locally at angles lower than 90 degrees, as soon as flow reversal at impingement builds up, (iii) average shear tends to decrease for increasing angle; however, max shear is characterized by some sort of maximum at flow inversion (i.e., flow reversal at impingement).

In addition, from the numerical simulation results, it was found that the best removal of a biofilm will be when both pressure and shear are higher than certain thresholds (i.e., values typical for biofilm damage described in related literature). Accordingly, the impact angle needed for optimal biofilm removal is higher than 15°. From the numerical simulation of microburst spray or jet treatment of biofilm in a realistic interproximal space at different angles, it was found that with the increase of the impact angle (e.g., from 15 degrees to 30 degrees), cleaning of the biofilm was better (i.e., the cleaned and treated area is increased).

Figure 1:
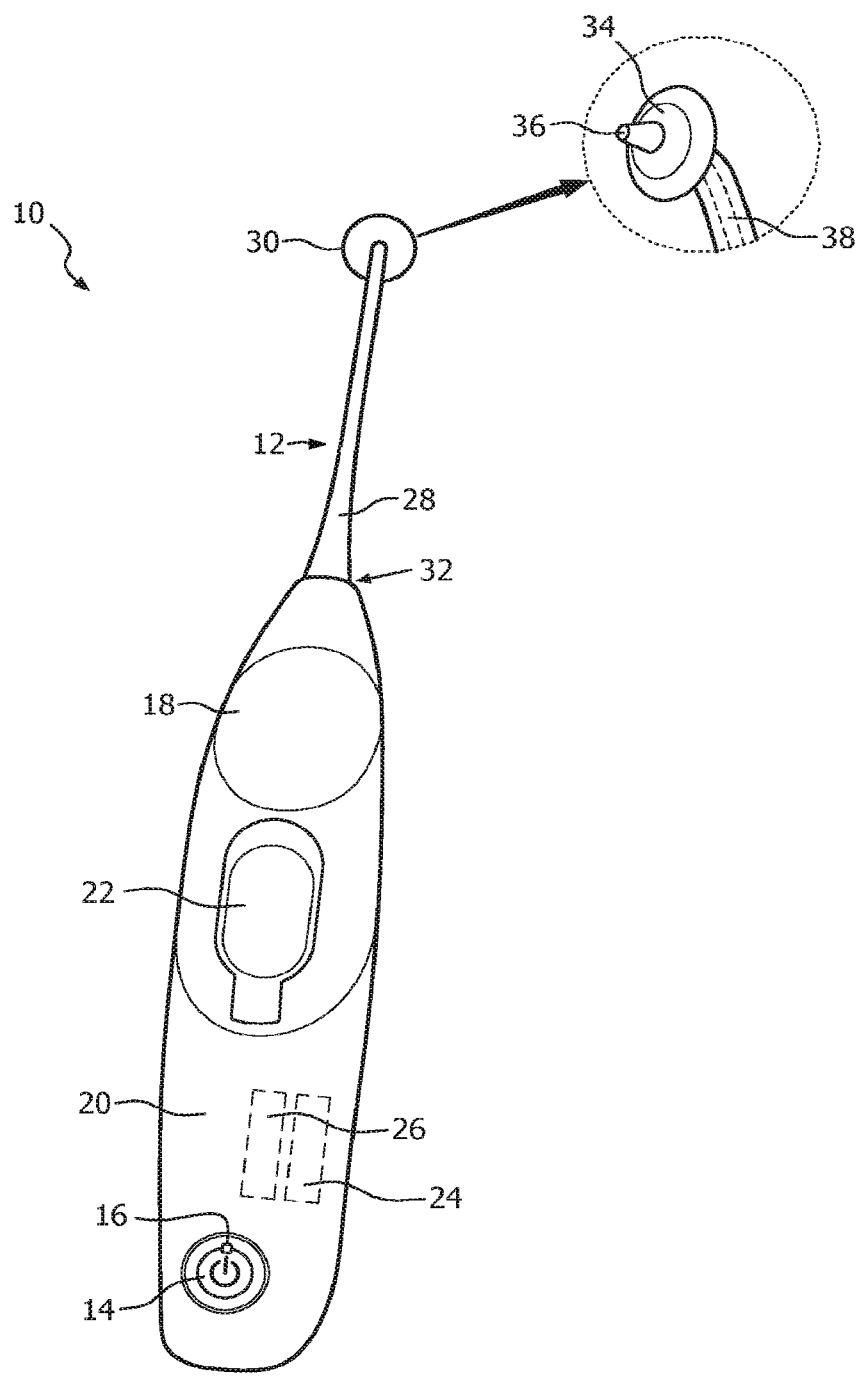
FIG. 1 is a perspective view of an oral irrigator device including a nozzle spacer assembly according to an embodiment of the present disclosure.

With reference now to FIG. 1, a perspective view of an oral irrigator device 10 including a nozzle 12 with a guidance tip 34 including a nozzle spacer assembly for high impact angles according to an embodiment of the present disclosure is shown. In one example, the oral irrigator device comprises a biofilm removal device. The oral irrigator device 10 includes a power ON/OFF button 14, a charge indicator 16, an activation button 18, an ergonomic handle 20, a liquid reservoir 22, a microburst pump 24, and control electronics 26. The nozzle 12 includes an elongated body 28 having a distal end, generally indicated by reference numeral 30, and a proximal end, generally indicated by reference numeral 32. The distal end 30 includes a guidance tip 34 with an orifice 36, wherein the orifice 36 is configured to exhaust a fluid as one of a jet, a spray, or any combination thereof, to be discussed further herein below. In addition, the distal end 30 comprises a generally circular cross-section or shape. Furthermore, in one embodiment, the proximal end 32 of the elongated body 28 is configured for being coupled to a distal end of the handle 20 of the oral irrigator device 10. Responsive to coupling of the proximal end 32 of the elongated body 28 of the fluid exhaust nozzle 12 to the distal end of the handle 20, an appropriate connection between the reservoir 22 and the orifice 36, via the air/liquid delivery conduit or channel 38, are made for a given implementation. In the embodiments of the present disclosure, the control electronics 26 comprise any suitable controller, microcontroller, processor, power source and/or other electronics to provide power and control signals for implementing the various functions, or any combination thereof, as discussed further herein.

In one embodiment, the activation button 18 of the oral irrigator device 10 is operable between an OFF state and at least one activation ON state. The at least one activation ON state can comprise one or more states for causing the pump 24 to be operable to pump the fluid from the reservoir 22 to the orifice 36 and the orifice 36 expels or exhausts the fluid as a jet, a spray, or any combination thereof, according to the requirements of a given oral irrigator device application.

Figure 2:
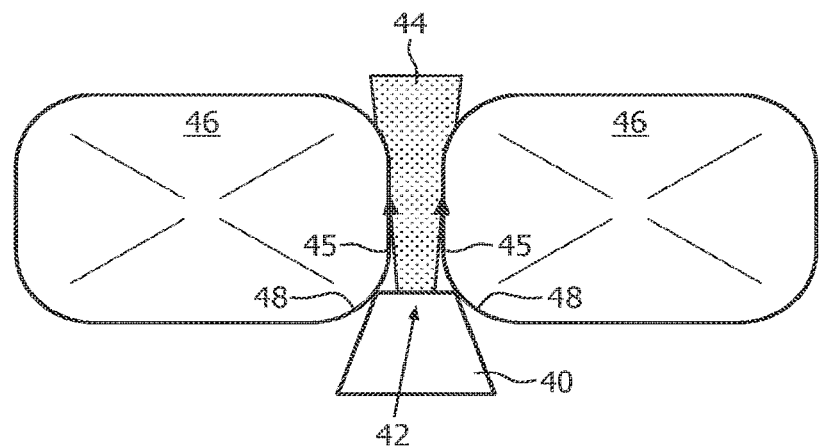
FIG. 2 is a schematic view of an existing nozzle design of a known oral irrigator device having an interproximal reach that is mainly limited to invisible interproximal plaque.

Turning now to FIG. 2, there is shown a schematic view of an existing nozzle 40 of a known oral irrigator device having an interproximal reach that targets mainly invisible interproximal plaque. The nozzle 40 comprises a static, non-dynamic nozzle with an orifice 42 that is stationary with respect to the nozzle. In addition, an efficacy of the nozzle 40 is limited since the area reached effectively is limited by the nozzle design, with a fairly narrow and focused spray 44 on the so-called interproximal area, generally indicated by reference numeral 45, below the contact points of neighbouring teeth 46 towards the gingival tissue. As a consequence, the more accessible and visible proximal surfaces, indicated by reference numeral 48, are not as affected. In addition, the nozzle 40 of FIG. 2 suffers in that the fluid hits the proximal surfaces of the teeth in the interproximal space at shallow angles from 0 to about 15 degrees.

Figure 3:
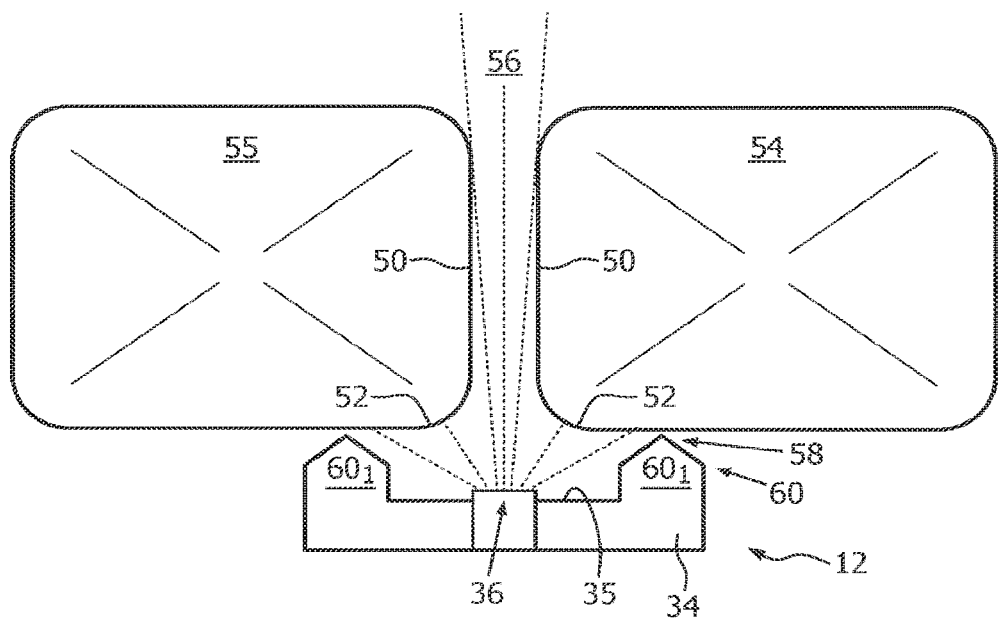
FIG. 3 is a schematic view of a nozzle design of an oral irrigator device of the present invention having at least one orifice with an interproximal reach that targets both visible and invisible interproximal plaque according to an embodiment of the present disclosure.

With reference now to FIG. 3, there is shown a schematic view of a guidance tip 34 of nozzle 12 of an oral irrigator device 10 (FIG. 1) of the present invention having an interproximal reach that targets both plaque that occurs on both invisible and visible surfaces, generally indicated by reference numerals 50 and 52, respectively, of neighbouring teeth 54 and 55, according to an embodiment of the present disclosure. Guidance tip 34 of nozzle 12 includes at least one orifice 36 coupled to the channel 38 and disposed within a surface 35 of the guidance tip 34. The at least one orifice 36 is configured to expel a fluid as one of a jet, a spray, or any combination thereof, generally indicated by reference numeral 56. To increase efficacy of the oral irrigator device 10, its effective reach is increased from the invisible proximal surface areas targeted with an existing nozzle design, as shown in FIG. 2, to extend beyond this area and include a larger fraction of the proximal surfaces, as shown in FIG. 3.

With reference now to FIGS. 3 and 4, the nozzle design includes a nozzle spacer assembly 58 positioned around the at least one orifice 36 of the guidance tip 34, wherein the nozzle spacer assembly 58 comprises at least two pairs of pliable spacers 60 that extend from the surface 35 of the guidance tip 34 by a prescribed amount for both (i) ensuring that teeth portions at an entrance of an interproximal space between two teeth (54, 55) are treated by fluid 56 expelled from the at least one orifice 36, and (ii) establishing an angle of impact of the fluid 56 expelled from the at least one orifice 36 into the interproximal space between the two teeth (54, 55), onto respective proximal surfaces thereof, to be higher than a threshold impact angle. In various embodiments, the at least two pairs of pliable spacers 60 can extend perpendicular, or other than perpendicular, from the surface 35 of the guidance tip 34.

In other words, the at least one nozzle orifice 36 is positioned further from the interproximal space, wherein the at least one nozzle orifice 36 will ensure that portions of the teeth surfaces in front of the interproximal space are also treated. According to one embodiment, one way to increase the impact angles is to render the orifice 36, or outlet of the nozzle, further away from the interproximal space, by means of a distance holder, for example, soft or pliable tips of the nozzle spacer assembly 58 around the orifice 36 or nozzle outlet. This will ensure that portions of the teeth at the entrance of the interproximal space are treated and higher angles of impact in the interproximal space will be achieved. The soft or pliable tips 60 of the nozzle spacer assembly 58 can take any number of physical shapes or forms, so long as the pliable tips provide an adequate strength to maintain a given distance spacing between a tooth surface and the orifice. For example, the pliable tips can comprise cone-shaped spacers having a circular and/or ellipsoidal cross-section. In addition, the distance or spacing provided by the pliable tips, between a plane of the nozzle outlet/orifice 36 and a plane of distal ends of the pliable tips, can include a distance or spacing on the order of 0.1 to 10 mm.

With reference now to FIG. 4, there is shown a top view (4A) and sectional view (4B) along A-A of a nozzle 12 of an oral irrigator device 10 including a nozzle spacer assembly 58 for high impact angles. As noted above, the nozzle spacer assembly 58 is positioned around the at least one orifice 36 of the guidance tip. The at least two pairs of pliable spacers 60 extend from the surface 35 of said guidance tip 34 by a prescribed amount. In one embodiment, the at least two pairs of pliable spacers 60 comprise a first pair $60_1$ and a second pair $60_2$, wherein the first pair $60_1$ extends along a line L1 in a first direction and the second pair $60_2$ extends along a line L2 in a second direction, and the lines (L1, L2) of the first and second pairs are perpendicular to one another. In addition, the at least two pairs of pliable spacers 60 are further configured for both (i) establishing a prescribed spacing between the at least one orifice 36 and a treatment surface (e.g., surface 52) and (ii) locating the guidance tip 34 laterally with respect to the interproximal spacing between two teeth (54,55), for example, as shown in FIG. 3. In other words, one pair of the pliable spacers advantageously provides for a registration of the nozzle with respect to the interproximal spacing between two teeth and the other pair of pliable spacers simultaneously ensures attainment of the prescribed spacing between the at least one orifice 36 and a treatment surface of the teeth.

With reference still to FIG. 4, there is shown another top view (4C) and sectional view (4D) along A-A of a nozzle 12 of an oral irrigator device 10 including a nozzle spacer assembly $58_1$ for high impact angles. This embodiment is similar to that of views (4A) and (4B), with the following differences. The nozzle spacer assembly $58_1$ is positioned around the at least one orifice 36 (i.e., designated by reference numerals 36, 36-1, 36-2, 36-3, and 36-4) of the guidance tip. The at least two pairs of pliable spacers 60 extend from the surface 35, and raised surface $35_1$, of said guidance tip 34 by respective prescribed amounts. In this embodiment, raised surface $35_1$ defines a wall that extends above surface 35 about an outer periphery thereof, having a shape in the form of a cone with a circular or ellipsoidal cross-section. In addition, as shown in FIG. 4D), orifice 36 is directed along a principal axis 37, generally perpendicular to surface 35, whereas the orifices 36-1 and 36-3 are directed away from the principal axis 37 by a prescribed angle (i.e., corresponding to a given fluid jet flow path). While not shown, orifices 36-2 and 36-4 may be similarly directed away from (or alternatively directed towards) the principal axis 37, according to the requirements of a given nozzle implementation. Flow paths of fluid expelled from a respective orifice (36, 36-1, 36-2, 36-3, and 36-4) can be easily understood from the disclosure herein.

With reference now to FIGS. 5 and 6, according to another embodiment, a nozzle $12_1$ of the oral irrigator device includes a first orifice $36_1$ and a second orifice $36_2$ with an interproximal reach that targets both visible and invisible interproximal plaque, as shown. The nozzle $12_1$ provides first and second paths, indicated by reference numerals 62 and 64, respectively, of a spray (FIG. 5) or a jet (FIG. 6) expelled from a respective one of the first and second orifice that cross over each other within the interproximal space between first and second teeth, 54 and 55, respectively, as shown in FIGS. 5 and 6. The orifices can be positioned on the nozzle and spaced from one another according to the requirements of a particular oral irrigator application. For example, in one embodiment, the two orifices are fully aligned in a horizontal direction. In another embodiment, the two orifices are not fully aligned in the horizontal direction. In addition, an exact positioning of a particular orifice with respect to the teeth depends, in part, on the teeth geometry itself. Furthermore, the pliable spacers 60 of the nozzle spacer assembly 58 ensure that the orifices are spaced from the interproximal space by a predetermined spacing sufficient to enable the attainment of high impact angles within the interproximal space between the first and second tooth. Moreover, the nozzle design with more than one orifice will ensure that teeth parts at the entrance of the interproximal (IP) space are treated and further ensure that higher angles of impact in the IP space are obtainable by putting the orifice further away from the IP space, via the pliable spacers of the nozzle spacer assembly.

With reference still to FIGS. 5 and 6, in one embodiment, the two orifices are evenly spaced apart from a center of the surface 35 of the guidance tip 34. That is, the two orifices are spaced apart from one another within the surface 35 of said the guidance tip 34 such that during use the first $36_1$ orifice is located in front of a tooth 55 and the second orifice $36_2$ is located in front of another tooth 54, adjacent to the tooth 55. In another embodiment, in response to fluid being expelled from the two orifices, the first orifice $36_1$ expels fluid partly on a first tooth 55 at respective surface 52 and mainly on a tooth surface 50 of a second tooth 54 at a first high impact angle within the interproximal space between the first and second tooth. The second orifice $36_2$ expels fluid partly on the second tooth 54 at respective surface 52 and mainly on a tooth surface 50 of the first tooth 55 at a second high impact angle within the interproximal space between the first and second tooth. The first and second high impact angles each comprise an angle greater than 15° measured from a surface normal (e.g., from tooth surface 50). Such high impact angles of greater than 15° from a surface normal can also be applicable to other embodiments discussed herein. As can easily be seen, the arrangement of orifices relative to the center of the surface 35 of the guidance tip 34 and spacer assembly 58 allow for the additional cleaning of the visible plaque on the surfaces at the corners of the teeth simultaneously with the cleaning of the invisible plaque on surfaces within the interproximal space.

With reference now to FIGS. 7 and 8, according to yet another embodiment, a nozzle $12_2$ of an oral irrigator device includes a first orifice $36_3$ and a second orifice $36_4$ with an interproximal reach that targets both visible and invisible interproximal plaque, as shown. The nozzle $12_2$ provides first and second paths, indicated by reference numerals 66 and 68, respectively, of a spray (FIG. 7) or a jet (FIG. 8) expelled from a respective one of the first and second orifice that do not cross over each other within the interproximal space between first and second teeth, 54 and 55, respectively, as shown in FIGS. 7 and 8. During operation of nozzle $12_2$, fluid expelled from the first orifice $36_3$ comprises at least one of a jet and a spray principally directed along a first path. Fluid expelled from the second orifice $36_4$ comprises at least one of a jet and a spray principally directed along a second path. The first and second paths do not cross each other within the interproximal space between a first tooth and a second tooth, as shown in FIGS. 7 and 8. In other words, during operation, a respective fluid flow out of the orifices of nozzle $12_2$ occurs at the same time; however, the orifices are designed such that the sprays or jets of the respective orifices do not interact with each other within the interproximal space. As can easily be seen, the arrangement of orifices relative to the center of the surface 35 of the guidance tip 34 and spacer assembly 58 allow for the additional cleaning of the visible portions of the surfaces at the corners of the teeth simultaneously with the cleaning of the surfaces within the interproximal space.

With reference now to FIGS. 9 and 10, according to yet another embodiment, a nozzle $12_3$ of an oral irrigator device having a first orifice $36_1$ and a second orifice $36_2$ with an interproximal reach that targets both visible and invisible interproximal plaque, similar to the embodiment of FIG. 5. The nozzle $12_3$ differs from nozzle $12_1$ in that in operation, the first and second paths, 62 and 64, respectively, of a spray are expelled from one of the first and second orifice, $36_1$ and $36_2$, respectively, at (i) a first time ($t_1$) and (ii) a second time ($t_2$), different from first time ($t_1$). In addition, the path of the respective first and second spray crosses over the other within the interproximal space between the first and second tooth. In addition, in one embodiment, the nozzle $12_3$ includes a fluid flow path which alternates fluid flow from one orifice (i.e., a first nozzle path) and the other orifice (i.e., a second or another nozzle path).

With reference now to FIGS. 11 and 12, according to another embodiment, nozzle $12_3$ of the oral irrigator device includes the first orifice $36_1$ and the second orifice $36_2$ with an interproximal reach that targets both visible and invisible interproximal plaque, having first and second paths, indicated by reference numerals 62 and 64, respectively, of a jet expelled from one of the first and second orifice respectively at (i) a first time ($t_1$) and (ii) a second time ($t_2$), different from first time ($t_1$). A path of the respective first and second jet crosses over the other within the interproximal space between the first and second tooth.

With reference again to FIGS. 9-12, the nozzle $12_3$ comprises at least two orifices in which expelled fluid timing alternates between a first path and a second path that cross one another. In other words, fluid expelled from the first orifice $36_1$ can comprise at least one of a spray (FIG. 9) and a jet (FIG. 11) principally directed along a first path 62 at a first moment in time. Fluid expelled from the second orifice $36_2$ can comprise at least one of a spray (FIG. 10) and a jet (FIG. 12) principally directed along a second path 64 at a second moment in time, different from the first moment in time. For example, fluid flow alternates from one and the other orifice at two different moments in time, indicated by $t_1$ and $t_2$, for one interproximal space. In addition, the first and second paths cross each other within the interproximal space between the first tooth and second tooth, adjacent the first tooth. Furthermore, in another embodiment, fluid is expelled in a controlled manner, via suitable control by control electronics 26 (FIG. 1), to alternate between the first orifice $36_1$ and the second orifice $36_2$ a predetermined number of times for a single interproximal space.

Turning now to FIG. 13, a top view (13A) and sectional view (13B) along A-A of a nozzle $12_4$ of an oral irrigator device with an orifice 36 embodied within a rotatable disc 70 and including a nozzle spacer assembly 58 for high impact angles according to an embodiment of the present disclosure is shown. For example, in one embodiment, disc 70 comprises a disc rotatably coupled, in a suitable manner, with respect to the surface 35. The rotatable disc includes at least one orifice, e.g., a single orifice 36, embodied within the rotatable disc and configured for enabling at least two different positions of the single orifice with respect to the interproximal space between two teeth. For example, four different positions are indicated in FIG. 13A via reference numerals 72, 74, 76, and 78. The different positions can include any number of vertical and/or horizontal positions achieved via rotation of the disc about its center, or axis of rotation. In addition, in one embodiment, the rotatable disc 70 includes an impellor located in a flow path of expelled fluid within the nozzle, wherein responsive to the expelled fluid imparting upon the impellor, the rotatable disc is turned to enable an achievement of the at least two different positions (e.g., vertical position, horizontal position, or any combination of the same) of the single orifice with respect to the interproximal space between two teeth. Accordingly, a greater treatment coverage area is obtainable via the rotatable disc 70 of nozzle $12_4$ than that obtainable with respect to other embodiments discussed herein.

With reference now to FIG. 14, a top view (14A) and sectional view (14B) along A-A of a nozzle $12_5$ of an oral irrigator device with multiple orifices, e.g., as indicated by reference numerals $36_5$, $36_6$, $36_7$, and $36_8$, and including a nozzle spacer assembly 58 for high impact angles according to another embodiment of the present disclosure is shown. In one embodiment, the at least one orifice 36 comprises multiple orifices ($36_5$, $36_6$, $36_7$, and $36_8$) disposed within the surface 35 of the guidance tip 34, wherein each of the multiple orifices ($36_5$, $36_6$, $36_7$, and $36_8$) expels fluid in a different radial direction, i.e., radial direction inward with respect to a principal axis of the guidance tip 34. In one embodiment, the multiple orifices comprise at least three orifices for radially expelling fluid, and thus reducing a need for an exact positioning of the nozzle with respect to the teeth being treated.

Turning now to FIG. 15, a nozzle $12_6$ of an oral irrigator device having a dual distance guidance tip $34_1$ that includes a first orifice $36_1$ and a second orifice $36_2$ within a surface 35 thereof and at least one interproximal orifice ($36_9$,$36_{10}$) disposed on an interproximal extension 80 of the guidance tip $34_1$ that extends at a predetermined distance beyond the surface 35 of the guidance tip $34_1$, configured for removable placement within the interproximal space between the two teeth, and configured to expel fluid with a spray angle greater than a threshold amount to at least one side of the two teeth within the interproximal space, is shown. In the embodiment of FIG. 15, the guidance tip $34_1$ comprises a dual distance tip with first and second orifices ($36_1$ and $36_2$) on surface 35 and further includes at least one interproximal orifice ($36_9$, $36_{10}$) disposed on an interproximal extension 80 of the guidance tip $34_1$ that extends at a predetermined distance beyond the surface 35 of the guidance tip. The interproximal extension 80 is configured for removable placement within the interproximal space between two teeth. In addition, the at least one interproximal orifice ($36_9$, $36_{10}$) is configured to expel the fluid as one of a jet, a spray, or any combination thereof, with a spray angle greater than a threshold amount to at least one side of the two teeth within the interproximal space.

The dual distance design of the nozzle $12_6$ of FIG. 15 advantageously enables a portion of the nozzle to be removably placed deep within an interproximal space and to shoot or expel fluid more to the sides of the interproximal space. The extension portion of the nozzle is thin enough to fit within the interproximal space between teeth, and provides a fluid spray with a large spray angle to the sides. The expelled fluid to the sides impacts the hard to reach space between molars at larger impact angles. Additional nozzle orifices are present in the surface of the guidance tip in order to not miss the outer part of the interproximal space at the outside of the space.

According to the present disclosure, the oral irrigator device 10 of FIG. 1 includes a nozzle according to the various embodiments as illustrated and described. The oral irrigator device 10 further comprises a handle 20, an activation button 18 disposed on the handle operable between an OFF state and at least one activation ON state, a fluid reservoir 22 for holding a fluid, and a pump 24 coupled to the fluid reservoir. The proximal end 32 of the nozzle 12 couples to a distal end of the handle 20. In response to disposing the activation button 18 to the at least one activation ON state, the pump 24 is operable to pump the fluid to the orifice 36 and the orifice expels the fluid as one of a jet, a spray, or any combination thereof.

According to a still further embodiment of the present disclosure, a method of expelling fluid from a nozzle for an oral irrigator device, comprises: providing an elongated body having a channel; providing a guidance tip located at one end of the elongated body, wherein the guidance tip includes at least one orifice coupled to the channel and disposed within a surface of the guidance tip, wherein the at least one orifice is configured to expel a fluid as one of a jet, a spray, or any combination thereof; and providing a nozzle spacer assembly positioned around the at least one orifice of the guidance tip. The nozzle spacer assembly comprises at least two pairs of pliable spacers that extend from the surface of said guidance tip by a prescribed amount for both (i) ensuring that teeth portions at the entrance of an interproximal space between two teeth are treated by fluid expelled from the at least one orifice, and (ii) establishing an angle of impact of the fluid expelled from the at least one orifice into the interproximal space between the two teeth to be higher than a threshold impact angle.

In one embodiment the method further includes providing the at least two pairs of pliable spacers of the nozzle spacer assembly that comprise a first pair and a second pair. The first pair extends along a line in a first direction and the second pair extends along a line in a second direction, and the lines of the first and second pairs are perpendicular to one another. In another embodiment, the method further includes configuring the at least two pairs of pliable spacers in a manner that accomplishes both (i) establishing a prescribed spacing between the at least one orifice and a treatment surface and (ii) locating the guidance tip laterally with respect to the interproximal spacing between two teeth.

In yet another embodiment, the method further comprises providing a disc rotatably coupled to the surface of the guidance tip, wherein the at least one orifice comprises a single orifice embodied within the rotatable disc configured for enabling at least two different vertical positions of the single orifice with respect to the interproximal space between two teeth. In addition, providing the rotatable disc further includes providing an impellor located in a flow path of expelled fluid, wherein responsive to the expelled fluid imparting upon the impellor, the rotatable disc is turned to enable an achievement of the at least two different positions of the single orifice with respect to the interproximal space between two teeth. Furthermore, providing the guidance tip comprises providing a dual distance tip that further includes at least one interproximal orifice disposed on an interproximal extension of said guidance tip that extends at a distance beyond the surface of said guidance tip, configured for removable placement within the interproximal space between the two teeth. The at least one interproximal orifice is configured to expel the fluid as one of a jet, a spray, or any combination thereof, with a spray angle greater than a threshold amount to at least one side of the two teeth within the interproximal space.

Although only a few exemplary embodiments have been described in detail above, those skilled in the art will readily appreciate that many modifications are possible in the exemplary embodiments without materially departing from the novel teachings and advantages of the embodiments of the present disclosure. For example, the embodiments of the present disclosure can be advantageously used in various oral irrigator device applications. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements, and/or by means of a suitably programmed computer. In a device claim enumerating several means, several of these means may be embodied by one and the same item of hardware. The mere fact that certain measures are recited in mutually different dependent claims does not indicate that a combination of these measures cannot be used to an advantage.

The invention claimed is:

1. A nozzle for an oral irrigator device, comprising:
   an elongated body having a channel;
   a guidance tip located at a distal end of the elongated body, wherein said guidance tip includes two orifices coupled to the channel and disposed within a surface of said guidance tip, the orifices evenly spaced apart from a center of the surface of said guidance tip, and further being spaced apart from one another within the surface of said guidance tip such that during use the first orifice is located in front of a first tooth and the second orifice is located in front of a second tooth wherein the orifices are configured to expel a fluid as one of a jet, a spray, or any combination thereof; and
   a nozzle spacer assembly positioned around the orifices of said guidance tip, wherein said nozzle spacer assembly comprises at least two pairs of pliable spacers that extend from the surface of said guidance tip by a prescribed amount for establishing an angle of impact of the fluid expelled from the orifices, wherein a portion of each of the pliable spacers of the at least two pairs of pliable spacers are cone-shaped and a portion of each of the pliable spacers of the at least two pairs of pliable spacers are cylindrical, and wherein the cone-shaped portion of each pliable spacer tapers to a point, and the prescribed amount is a distance between 0.1 mm and 10 mm.

2. The nozzle of claim 1, wherein the at least two pairs of pliable spacers of the nozzle spacer assembly comprise a first pair and a second pair, wherein the first pair extends along a first line in a first direction and the second pair extends along a second line in a second direction, and the first and second lines of the first and second pairs are perpendicular to one another.

3. The nozzle of claim 1, wherein the at least two pairs of pliable spacers are further configured for establishing a prescribed spacing between the two orifices and a tooth surface and locating the guidance tip laterally with respect to an interproximal spacing between two teeth.

4. The nozzle of claim 1, wherein responsive to fluid being expelled from the two orifices, the first orifice is arranged to expel fluid on at least a portion of the first tooth and on a tooth surface of the second tooth at a first impact angle within an interproximal space between the first and second tooth, and wherein the second orifice is arranged to expel fluid on at least a portion of the second tooth and on a tooth surface of the first tooth at a second impact angle within an interproximal space between the first and second tooth, wherein the first and second impact angles each comprise an angle greater than 15° measured from a surface normal of the tooth surface of the first or second tooth.

5. The nozzle of claim 1, wherein fluid expelled from the first orifice comprises at least one of a jet and a spray principally directed along a first path, wherein fluid expelled from the second orifice comprises at least one of a jet and a spray principally directed along a second path, and wherein the first and second paths cross each other within an interproximal space between the first and second tooth.

6. The nozzle of claim 1, wherein fluid expelled from the first orifice comprises at least one of a jet and a spray principally directed along a first path, wherein fluid expelled from the second orifice comprises at least one of a jet and a spray principally directed along a second path, and further wherein that first and second paths do not cross each other within an interproximal space between the first and second tooth.

7. The nozzle of claim 1, further wherein fluid expelled from the first orifice comprises at least one of a jet and a spray principally directed along a first path at a first moment in time, wherein fluid expelled from the second orifice comprises at least one of a jet and a spray principally directed along a second path at a second moment in time, different from the first moment in time, and wherein the first and second paths cross each other within an interproximal space between the first and second tooth.

8. The nozzle of claim 1, further wherein the nozzle is arranged to expel fluid in an alternating pattern to alternate between the first orifice and the second orifice a predetermined number of times for a single interproximal space.

9. The nozzle of claim 1, further comprising a disc rotatably coupled to the surface, and wherein the two orifices are embodied within the rotatable disc configured for enabling at least two different positions of the orifice disc with respect to an interproximal space between two teeth.

10. The nozzle of claim 1, wherein the at least two orifices comprises multiple orifices disposed within the surface of said guidance tip, wherein each of the multiple orifices expels fluid in a different radial direction.

11. The nozzle of claim 1, wherein said guidance tip comprises a dual distance tip that further includes at least one interproximal orifice disposed on an interproximal extension of said guidance tip that extends at a distance beyond the surface of said guidance tip, configured for removable placement within an interproximal space between the two teeth, and wherein the at least one interproximal orifice is configured to expel the fluid as one of a jet, a spray, or any combination thereof, with a spray angle greater than a threshold amount to at least one side of the two teeth the first or second tooth within the interproximal space.

12. A nozzle for an oral irrigator device, comprising:
an elongated body having a channel;
a guidance tip located at a distal end of the elongated body, wherein said guidance tip includes two orifices coupled to the channel and disposed within a surface of said guidance tip, the orifices evenly spaced apart from a center of the surface of said guidance tip, and further being spaced apart from one another within the surface of said guidance tip such that during use the first orifice is located in front of a first tooth and the second orifice is located in front of a second tooth wherein the orifices are configured to expel a fluid as one of a jet, a spray, or any combination thereof; and
a nozzle spacer assembly positioned around the orifices of said guidance tip, wherein said nozzle spacer assembly comprises at least two pairs of pliable spacers that extend from the surface of said guidance tip by a prescribed amount for establishing an angle of impact of the fluid expelled from the orifices, wherein each of the pliable spacers of the at least two pairs of pliable spacers are cone-shaped and are integral to the guidance tip, and wherein the cone-shaped portion of each pliable spacer tapers to a point, and the prescribed amount is a distance between 0.1 mm and 10 mm.

13. The nozzle of claim 12, wherein the prescribed amount is selected such that the angle of impact of the fluid expelled from the orifices is higher than a threshold impact angle wherein the threshold impact angle is between 15 and 30 degrees and the threshold impact angle is selected to remove biofilm and/or plaque from the first tooth or the second tooth.

* * * * *